(12) United States Patent
Kaufmann et al.

(10) Patent No.: US 10,921,440 B2
(45) Date of Patent: Feb. 16, 2021

(54) PERSONAL PROTECTION SYSTEM WITH RF TIME-OF-FLIGHT RANGING

(71) Applicant: SAFEMINE AG, Baar (CH)

(72) Inventors: Thomas Kaufmann, Zürich (CH); Tommi Juhani Kauppinen, Manly West (AU)

(73) Assignee: SAFEMINE AG, Baar (CH)

( * ) Notice: Subject to any disclaimer, the term of this patent is extended or adjusted under 35 U.S.C. 154(b) by 183 days.

(21) Appl. No.: 16/172,123

(22) Filed: Oct. 26, 2018

(65) Prior Publication Data

US 2019/0129025 A1    May 2, 2019

(30) Foreign Application Priority Data

Oct. 26, 2017 (EP) .................... 17198717

(51) Int. Cl.
| | |
|---|---|
| *G01S 13/87* | (2006.01) |
| *G01S 13/88* | (2006.01) |
| *G01S 5/02* | (2010.01) |
| *G01S 13/931* | (2020.01) |
| *G01S 13/76* | (2006.01) |

(52) U.S. Cl.
CPC .......... *G01S 13/878* (2013.01); *G01S 5/0284* (2013.01); *G01S 13/76* (2013.01); *G01S 13/886* (2013.01); *G01S 13/931* (2013.01); *G01S 2013/9315* (2020.01)

(58) Field of Classification Search
CPC .............................. G01S 13/878; G01S 5/0284
See application file for complete search history.

(56) References Cited

U.S. PATENT DOCUMENTS

| | | | |
|---|---|---|---|
| 6,084,544 A | 7/2000 | Camp, Jr. | |
| 10,026,290 B2 * | 7/2018 | Dahbura | G08B 13/00 |
| 2003/0052797 A1 | 3/2003 | Rock et al. | |
| 2005/0104736 A1 * | 5/2005 | Gudat | B66C 15/045 |
| | | | 340/686.6 |
| 2008/0018472 A1 * | 1/2008 | Dasilva | F16P 3/147 |
| | | | 340/572.4 |
| 2010/0271263 A1 * | 10/2010 | Moshfeghi | H04W 4/025 |
| | | | 342/378 |
| 2011/0227748 A1 * | 9/2011 | Schaible | G08B 21/18 |
| | | | 340/686.6 |
| 2011/0249118 A1 * | 10/2011 | Bruno | B60W 30/0953 |
| | | | 348/148 |

(Continued)

FOREIGN PATENT DOCUMENTS

| | | |
|---|---|---|
| CA | 2426920 A1 | 5/2002 |
| CA | 2471568 A1 | 7/2003 |

(Continued)

OTHER PUBLICATIONS

CL Office Action in Application No. 201802981 dated Nov. 26, 2019.

(Continued)

*Primary Examiner* — Marcus E Windrich
(74) *Attorney, Agent, or Firm* — Maschoff Brennan

(57) ABSTRACT

A radio frequency time-of-flight ranging system for protecting pedestrians and vehicles on mine sites or similar environments with heavy duty equipment, the system particularly locates people around heavy duty equipment and warns both pedestrian and equipment operator.

13 Claims, 5 Drawing Sheets

(56) References Cited

U.S. PATENT DOCUMENTS

| | | | |
|---|---|---|---|
| 2013/0271274 A1* | 10/2013 | Ebert | E02F 9/24 |
| | | | 340/435 |
| 2014/0104108 A1 | 4/2014 | Holford et al. | |
| 2014/0244098 A1* | 8/2014 | Ueda | G06Q 10/047 |
| | | | 701/29.3 |
| 2017/0139029 A1 | 5/2017 | Casagrande | |
| 2017/0168133 A1 | 6/2017 | Daehler | |
| 2018/0329384 A1* | 11/2018 | Georgeson | G05B 9/02 |

FOREIGN PATENT DOCUMENTS

| | | |
|---|---|---|
| CA | 2755033 A1 | 10/2010 |
| CN | 106970352 A | 7/2017 |
| GB | 2358750 A | 8/2001 |
| GB | 2371701 A | 7/2002 |
| MX | 2014003311 A1 | 9/2015 |
| WO | 03/027705 A1 | 4/2003 |
| WO | 2011/130861 A1 | 10/2011 |
| WO | 2014/043824 A1 | 3/2014 |

OTHER PUBLICATIONS

Extended European Search Report dated Mar. 28, 2018 as received in Application No. 17198717.5.

Normon Abramson, "The ALOHA System—Another Alternative for Computer Communications", Proc. 1970 Fall Joint Computer Conference. AFIPS Press. 1970.

* cited by examiner

PERSONAL PROTECTION SYSTEM WITH RF TIME-OF-FLIGHT RANGING

CROSS-REFERENCE TO RELATED APPLICATIONS

This application claims priority to European Patent Application No. 17198717 filed on Oct. 9, 2017. The foregoing patent application are incorporated herein by reference.

FIELD OF INVENTION

The invention relates to a system for generating proximity warnings on a site. More particularly, the present invention relates to a system for generating proximity warnings for a surface mine, a construction site, or an agricultural area.

BACKGROUND

By way of example, surface mines and similar sites or areas are generally operated by means of a large number of machinery, vehicles, and staff. Some of the machines or vehicles may be exceedingly large and heavy, wherein control of such oversized objects is difficult and dangerous, e.g. because of limited operator visibility. Thus, a person or a regular vehicle, e.g. a street legal vehicle, working in the vicinity is at risk from a movement of this oversized object.

It has been proposed to use GNSS-devices (GNSS=global navigation satellite system, such as GPS) on board of vehicles and other objects, such as cranes, to generate proximity warnings in order to reduce the risk of collisions between vehicles and/or persons. Such a system may be based on devices mounted to the objects, each device comprising a GNSS receiver, a control unit for deriving positional data using the signal of the GNSS receiver, a radio circuit for wireless exchange of the positional data with the other devices, and an output device for outputting proximity warnings, e.g. allowing the driver of a vehicle to obtain information on some of the obstacles or persons nearby.

However, a GNSS system may lose accuracy, e.g. when multi-path situations occur. For example, a multi-path situation occurs when signals transmitted from GNSS satellites are reflected by local terrain, buildings, or machinery, thereby resulting in a plurality of signals being received by the GNSS receiver. Due to the plurality of signals being received, each of which may be phase shifted and/or time delayed, the GNSS receiver may not be able to accurately detect its location. Thus, if the GNSS system loses accuracy, such as due to entering a multi-path environment, the overall warning system may be severely hindered in its accuracy.

The deficiencies of a GNSS based warning system may be overcome by using a radio based positioning system, i.e. a pseudolite type of positioning system using radio signals.

An assembly of radio frequency (RF) devices, often called "anchors" and "tags", may be distributed over several locations, which devices communicate with each other. Some of the devices may be installed on movable objects while others may be installed at fixed locations. In particular, a device may be mounted to a person, i.e. affixed to the person in such a manner that the person will carry it without requiring the use of his/her hands. For example, the device may be affixed to a piece of clothing or equipment that the person is wearing, such as a helmet or other personal protective equipment, e.g. high visibility clothing.

For example, a radio frequency device, i.e. an anchor or tag, may comprise a radio transceiver for RF time-of-flight measurements (e.g. by two-way ranging or by time-difference-of-arrival), based on a defined measurement protocol for radio communication, e.g. the ALOHA protocol. In particular, ultra-wideband signals may be used to mitigate for multi-path effects.

However, point-to-point radio frequency ranging between, e.g., one anchor and a tag solely provides the distance but no direction to the tag. At least three anchors are required to unambiguously provide the tag position relative to the three-anchor arrangement.

Therefore, for providing an accurate and reliable proximity warning system a multitude of anchors is required. However, many anchor-tag configurations nevertheless remain, wherein accurate triangulation may be hindered, e.g. because of the large and bulky structure of the oversized objects, and thus wherein the overall warning system may be severely hindered in its accuracy.

BRIEF DESCRIPTION

It is therefore an object of some embodiments of the present invention to provide an improved and more reliable proximity warning system which overcomes the above mentioned limitations.

Another object is to provide a fast-response proximity warning system.

A further object is to provide a radio frequency proximity warning system with reduced hardware complexity.

Those objects are achieved by realising the features of the independent claim. Features which further develop the invention in an alternative or advantageous manner are described in the dependent patent claims.

One embodiment of the invention relates to a system for generating proximity warnings on a site, particularly a surface mine, a construction site, or an agricultural area, on which a regular size object, particularly a person or a street legal vehicle, is at risk from a movement of an oversized movable object, e.g. a haul truck, a crane, a dragline, an excavator, a shovel, or a tractor.

The system comprises a point-to-point radio ranging system comprising a set of anchors, i.e. radio frequency (RF) devices, adapted and specifically foreseen to be mounted on the oversized object, a tag (RF-device) adapted and specifically foreseen to be mounted on the regular size object, e.g. a person, and a distance determining unit configured for providing a set of distance determinations between each one of the set of anchors and the tag, based on a defined measuring protocol, particularly based on the ALOHA protocol, of a time-of-flight measurement by radio frequency signals, particularly ultra-wideband signals.

Furthermore, the system comprises a warning unit configured for providing a proximity warning based on the set of distance determinations.

According to some aspects of the invention, the system further comprises an anchor status dataset stored in a system storage, comprising information on local positions within an arrangement of the set of anchors, e.g. a quadratic arrangement or a more complex arrangement corresponding to the contour of a vehicle, wherein a local position is assigned to each one of the set of anchors, and a position determining unit configured for determining position information of the tag relative to the arrangement of the set of anchors. The position information is determined based on an automated procedure comprising the steps of identifying one of the set of anchors as a position determination anchor, wherein the position determination anchor is defined as the anchor with the closest measured distance to the tag determined by the distance determining unit, and assigning a field of observation to the position determination anchor, particularly a field of solid angle, based on the anchor status dataset.

The warning unit comprises a position indicator, e.g. a display or an arrangement of LEDs, configured for indicating the position of the tag relative to the arrangement of anchors, based on at least a first indication associated with the field of observation assigned to the position determination anchor, e.g. a direction relative to the anchor arrangement, and a second indication associated with the distance between the position determination anchor and the tag.

In a particular embodiment of the system, the automated procedure for determining position information of the tag further comprises the steps of identifying another anchor as an auxiliary anchor to the position determination anchor, and deriving the position of the tag relative to the arrangement of anchors, based on the anchor status dataset, the field of observation assigned to the position determination anchor, and a triangulation including the position determination anchor, the auxiliary anchor, and the tag.

Thus, triangulation may be based on an assessment of different field of views assigned to different anchors, e.g. an assessment of what different anchors are actually able to see, given their mounting position on a bulky vehicle such as a haul truck.

In another embodiment, each one of the set of anchors comprises a first and a second transceiver, which are co-located and configured to be time synchronized, and the measuring protocol comprises determining a time difference between receive timestamps of radio frequency signals receiving the first transceiver and the second transceiver of the positioning determination anchor, in such a way that an angle-of-arrival of radio-frequency signals is calculated for the position determination anchor, based on the time difference. Therefore, assigning the field of observation to the position determination anchor may be based on the calculated angle-of-arrival of the position determination anchor.

By way of example, each one of the set of anchors may comprise its local position information with respect to the arrangement of anchors, and the measuring protocol may comprise transmission of anchor positions as payload within the point-to-point radio ranging system, in such a way that the position information of the tag is determined by the tag, particularly based on triangulation including the position determination anchor, the tag, and at least another one of the set of anchors, wherein the position information of the tag is transmitted to the set of anchors as payload within the point-to-point radio ranging system.

In a further embodiment, the system comprises a global positioning system, particularly based on at least one of a global navigation satellite system, a differential global navigation satellite system, a real time kinematic global positioning system, a total station, and a robotic total station, configured for providing global position information of the arrangement of anchors. Thus, each one of the set of anchors may be provided with global positioning information from the global positioning system, and the measuring protocol may comprise transmission of absolute anchor positions as payload within the point-to-point radio ranging system, based on local position information of anchors and the global positioning information, in such a way that the position information determined by the tag is determined as an absolute position.

In another embodiment, the system may comprise a global positioning system, particularly based on at least one of a global navigation satellite system, a differential global navigation satellite system, and a real time kinematic global positioning system, configured for providing global position information of the arrangement of anchors, and each one of the set of anchors may comprise its local position information with respect to the arrangement of anchors. Thus, each one of the set of anchors may be provided with global positioning information (normal, differential or RTK) from the global positioning system, and the system may further comprise a central position determination unit, wherein the system is configured that absolute anchor positions, based on local position information of anchors and the global positioning information, and the set of distance determinations are provided to the central position determination unit, in such a way that the position information of the tag is determined by the central position determination unit as an absolute position based on triangulation including the position determination anchor, the tag, and at least another one of the set of anchors.

For example, the arrangement of anchors may comprise at least three anchors, which are arranged in such a way that the vertical projection points of the at least three anchors are arranged along the sides of a rectangular basic shape and that a combination of assigned fields of observation of the at least three anchors provides a horizontal all-round visibility around the basic rectangular shape, particularly wherein a first anchor projection is arranged at a first corner of the basic rectangular shape (e.g. the anchor being foreseen to correspond to the front left corner of a haul truck), a second anchor projection is arranged at a second corner, adjacent to the first corner, of the basic rectangular shape (e.g. the anchor being foreseen to correspond to the front right corner of the haul truck), and a third anchor projection is arranged at the side of the basic rectangular shape opposite to the side spanned by the first and second anchor (e.g. the anchor being foreseen to correspond to the rear of the haul truck). The before mentioned anchors may also be situated in different vehicles augmenting the reference position information and distances for the trilateration.

Furthermore, in a particular embodiment a fourth anchor may be arranged in such a way that its vertical projection point lies within the basic rectangular shape (e.g. the anchor being foreseen to correspond to a mounting position at the bottom of the haul truck).

By way of example, the position indicator may be configured to provide the position indication of the tag by at least one of a visual coding, particularly a defined color coding and/or a defined blink coding, an acoustic coding, particularly by voice signal and/or by beep code, and a tactile coding, particularly by a vibrating tag and/or anchor component.

The position indication may further comprise indication of a threat level, particularly by at least one of a visual coding, particularly a defined color coding and/or a defined blink coding, an acoustic coding, particularly by voice signal and/or by beep code, and a tactile coding, particularly by a vibrating tag and/or anchor component.

For example, the threat level may be determined based on at least one of a tag identification (tag ID), an anchor identification (anchor ID), the position information of the tag, particularly the distance to the arrangement of anchors and/or a position determination anchor identification, heading information for the arrangement of anchors, and the speed of the arrangement of anchors.

In particular, in another embodiment, different position determination modes, particularly a single anchor based position determination mode and a triangulation based position determination mode, and/or different position indication modes may be triggered based on a defined set of threat levels.

By way of example, the position information and/or the threat level may then be transmitted as payload within the point-to-point radio ranging system.

BRIEF SUMMARY OF THE DRAWINGS

The method and system according to the invention are described or explained in more detail below, purely by way of example, with reference to working examples shown schematically in the drawing. Specifically, FIG. 1a,b: schematically depicts sites in the sense of the invention, here as a surface mine (a) and a construction site (b).

DETAILED DESCRIPTION

FIG. 1 schematically depicts two typical sites and environments with heavy duty equipment foreseen for application of the inventive proximity warning system.

Figure 1A:
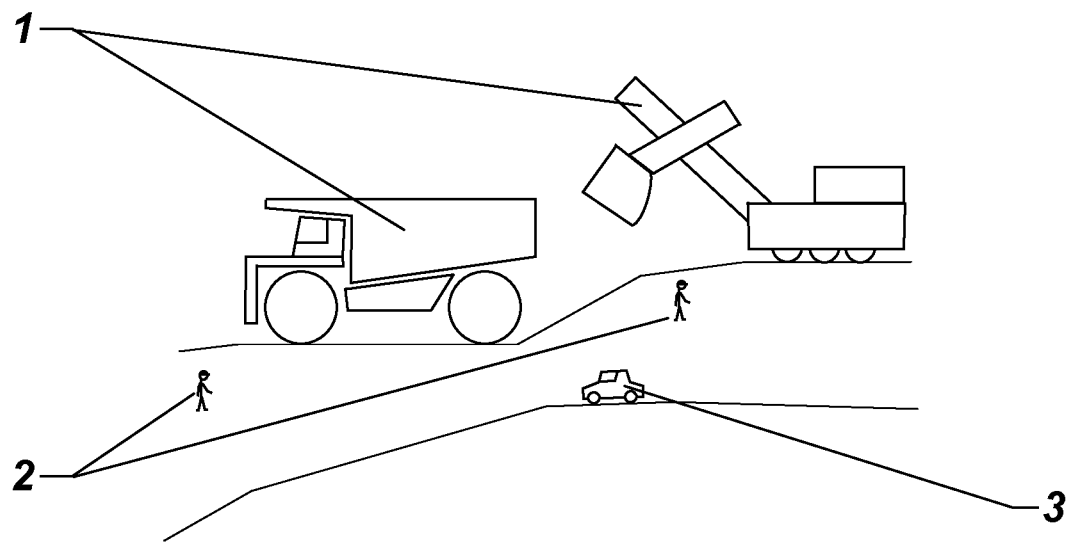

Typically, such sites cover a large area, in the case of a surface mine as depicted in FIG. 1a, e.g. in the range of square kilometres, with a network of roads and other traffic ways, such as rails. A plurality of oversized movable objects 1 may be present in the mine, e.g. haul trucks or heavy duty excavators, wherein pedestrians 2 or regular sized vehicles 3, e.g. street legal cars or trucks, are at severe risk from a movement of the oversized object 1.

Such oversized machinery or oversized vehicles may easily weigh several 100 tons, and they are generally difficult to control and have a large number of blind spots that the driver or operator is unable to constantly monitor. Any collision with a smaller object, in particular a pedestrian or a regular car, may be potentially fatal for the weaker object.

Furthermore, the mine, construction site, or agricultural field is comprised of stationary obstacles, such as temporary or permanent buildings, open pits, boulders, non-movable excavators, stationary cranes, deposits, etc. Given the large operating force exerted by such oversized machinery, a collision with a stationary obstacle may cause severe damage to both the oversized object and the stationary obstacle, and may even compromise safety of an operator of the oversized object.

Therefore, the risk of accidents in such an environment is high, specifically under adverse conditions as bad weather, during night shifts, etc.

Figure 1B:
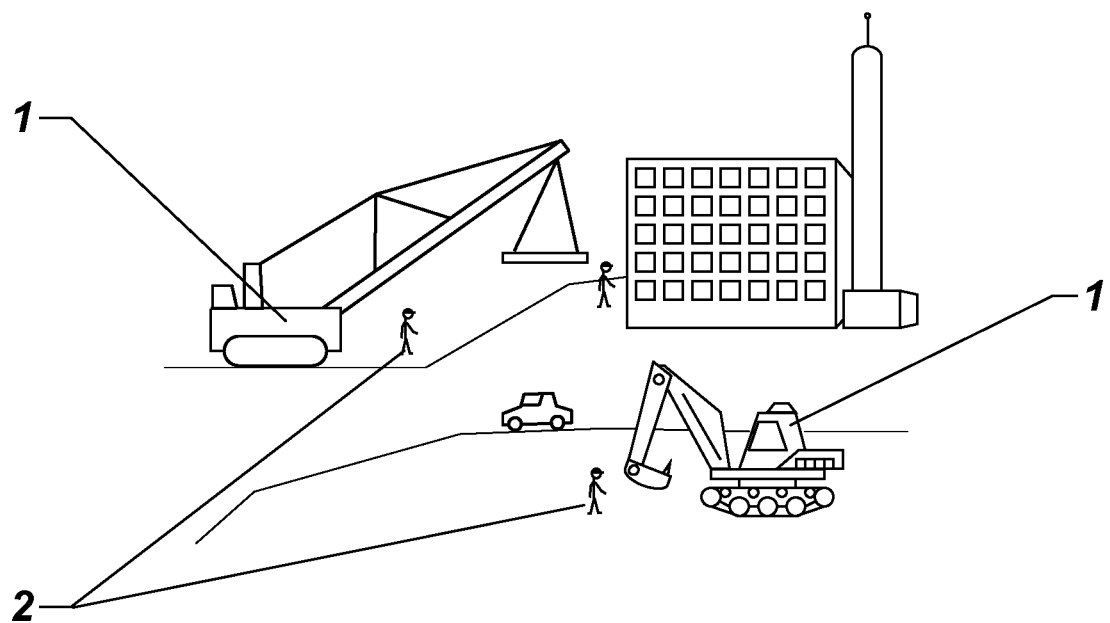

Similarly, on a construction site as depicted by FIG. 1b, heavy equipment 1 may be used, such as diggers, bulldozers, motor graders, or cranes.

For example, in road construction when a compactor is working in close proximity of a motor grader following it and the motor grader suddenly stops and starts to reverse can lead to a collision if neither of the operators is paying enough attention to their surroundings.

In general construction, for example a surveyor may be working in close proximity of an excavator without being noticed by the operator of the excavator. However, danger may also arise even if an operator of heavy machinery is paying attention. For example, an operator of a large cantilever crane may not immediately see small cantilever movements, e.g. caused by wind or inertia moments, which may be potentially dangerous for a spotter in the vicinity of the cantilever.

Figure 2A:
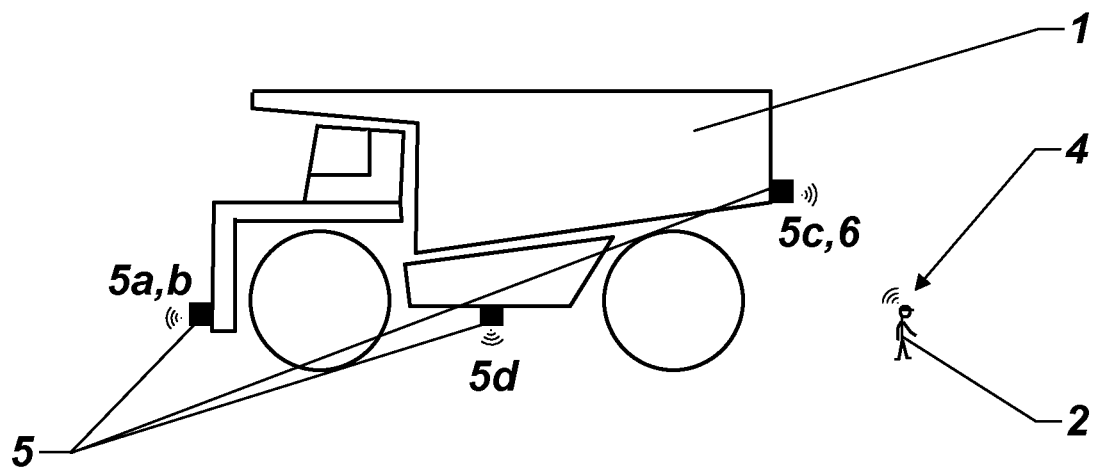
FIG. 2a,b: exemplary anchor and tag arrangement on a haul truck, seen from the side (a) and in vertical projection (b)

FIG. 2a schematically shows an application of the inventive proximity warnings system, here on a surface mine site and more particularly for protecting pedestrians 2 around a haul truck 1.

The system comprises of tags 4 to be worn by pedestrians 2, e.g. on their helmet or on a safety vest, and anchors 5 to be mounted at different positions on the haul truck 1. In order to have full coverage around the haul truck 1, at least three anchors 5 need to be placed on the vehicle. If fewer anchors are chosen, only partial coverage is achieved.

The tags 4 and anchors 5 are configured for radio frequency (RF) time-of-flight measurements (e.g. by two-way ranging) between anchors 5 and tags 4 to determine the distance between them. For example, measurements may be based on ultra-wideband signals to mitigate for multi-path effects and both anchor and tag may store measurement results.

In particular, both anchor 5 and tag 4 may have unique IDs, e.g. configured during manufacture.

By way of example, the tag 4 may periodically send a BLINK message, e.g. comprising payload including ID, protocol version, timing information for the time-of-flight determination in case of an anchor response (e.g. a predefined time delay, see below), battery status, panic button status, other sensor information, tag coordinates etc., wherein an anchor 5 responds with a ranging INIT message after a random time interval (e.g. within a limited time window), wherein payload may include ID and protocol version. The tag 4 responds with a ranging FINAL message immediately (with clearly defined delay), e.g. again comprising payload which may include ID, protocol version, tag coordinates, etc. The anchor 5 then responds with a ranging REPORT message, e.g. immediately or with a clearly defined delay, wherein payload may for example include ID, protocol version, warning distances from this vehicle, vehicle status, etc. The time-of-flight is measured as the difference between the anchor INIT transmit timestamp, the anchor FINAL receive timestamp, minus the time delay.

Thus, the above described measurement protocol uses ALOHA by nature. Alternatively, anchors may act as local coordinators, and define the order of tags that are ranged with.

The measurement protocol may further comprise reporting to a base, e.g. wherein after transmission/reception of a FINAL message, the anchor sends a CAN message and the tag enters measurement in queue.

Furthermore, the protocol may further comprise housekeeping, e.g. periodically, the tag computes a threat level based on reported distances, the tag measures battery charge status, wherein if battery charge falls below a safe status, the user may be alerted, e.g. visually, acoustically, or by tactile means, for example by a vibration of the tag housing. Housekeeping may further comprise that periodically, the anchor sends a heartbeat CAN message, wherein payload may include device status, number of rangings in this period, etc. Further, the system may comprise a main unit (not shown) and, periodically, the main unit may send a heartbeat CAN message to the anchors 5 (e.g. through a CAN bus or Ethernet), with individual pre-configured warning distances for each anchor.

The system further comprises an anchor status dataset stored in a system storage, comprising information on local positions within an arrangement of the set of anchors 5, wherein a local position is assigned to each one of the set of anchors. By way of an automated procedure, the anchor 6 which is closest to the pedestrian 2 is identified, i.e. wherein the closest distance is measured, and a field of observation is assigned to this anchor 6. Thus, already with a single anchor 6 a rough position of the tag relative to the haul truck 1 may be derived, based on the assigned field of observation and the determined distance, e.g. based on the knowledge of the shape of the haul truck and individual anchor locations.

Such a rough position indication may already be sufficient for assessing a severity of danger, e.g. further taking into account a rough absolute vehicle position (e.g. by GPS), a current vehicle heading, and/or a current vehicle speed.

For example, the haul truck operator may be given a distance indication in a sector (e.g. front-left if it is closest to the front-left anchor), wherein the severity of danger may be indicated based on an LED color and/or blinking frequency.

If two anchors 5 provide measured distances to the tag 4, the relative pedestrian position to the anchor arrangement, i.e. the haul truck, can be calculated through triangulation, e.g. by a position determination unit located on the haul truck, wherein the ambiguity in position is resolved with the knowledge of the anchor field of observation, e.g. depending on the local anchor position and the vehicle shape.

For example, triangulation may also be calculated on the tag 4, wherein each anchor 5 stores its local mounting position on the haul truck, and receives vehicle absolute position and heading through a vehicle bus, such that an absolute anchor position may be transmitted as payload in the RF framework. Thus, the tag 5 knows the position of, and distance to each anchor 5 in the vicinity, and the absolute position of the pedestrian 2 may be calculated on the tag 4. The tag 4 then transmits its currently known position to the anchors 5 as payload during the RF ranging.

In another example, triangulation may also be calculated on an external infrastructure, e.g. wherein each vehicle transmits its anchor measurements to a backbone infrastructure and triangulation is performed on a site-based (or remote) server, and transmitted back to vehicles. There the position may be shown the same way as above.

Figure 2B:
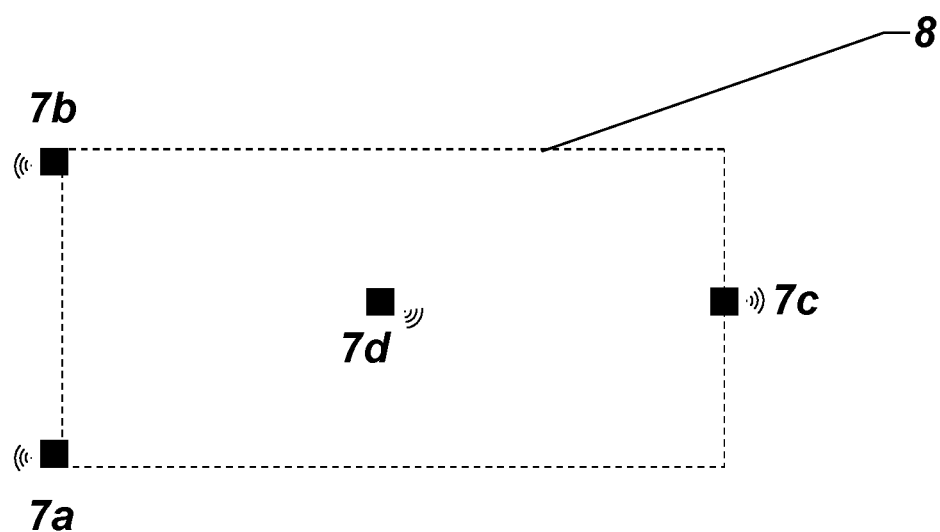

In the example shown by the figure, an arrangement of four anchors 5 is used, wherein a first anchor 5a is mounted at the front left of the haul truck 1, a second anchor 5b is mounted at the front right of the haul truck 1, and a third anchor 5c is mounted at the rear of the haul truck 1. Thus, as indicated by the schematic top view shown in FIG. 2b, these three anchors are arranged in such a way that the vertical projection points 7a,7b,7c of these anchors are arranged along the sides of a rectangular basic shape 8. In particular, a combination of the assigned field of observations of these three anchors 5a,5b,5c provides a horizontal all-round visibility around the basic rectangular shape 8, i.e. the haul truck 1.

Furthermore, a fourth anchor 5d is mounted at the bottom of the haul truck 1, i.e. its vertical projection 7d lies within the basic rectangular shape 8. Thus, also a person under the haul truck may be detected, which is particularly useful at start up, e.g. when the locks have been removed but some spotters or mechanics may still be working around or under the vehicle or when in hot conditions a worker rested in the shade of the haul truck.

Figure 3:
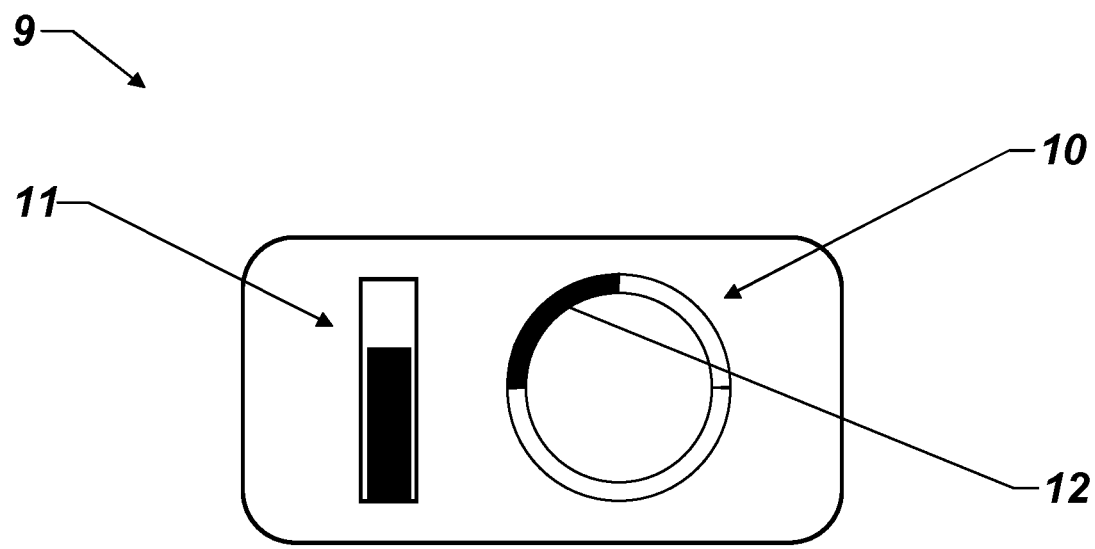
FIG. 3: exemplary position indicator for indicating the position of a tag in the vicinity of a movable object.

FIG. 3 shows a position indicator 9 of a warning unit according to the invention, for indicating to an operator of an oversized machine or vehicle 1 (FIG. 1) the position of the tag 4 (FIG. 2a) relative to the arrangement of anchors 5 (FIG. 2a) on the oversized object 1, based on at least a first indication 10 associated with the fields of observation of the anchors, and a second indication 11 associated with the distance between the position determination anchor 6 (FIG. 2a) and the tag 4.

In the shown example, an arrangement of three anchors 5 is used, e.g. an anchor at the front left of an oversized vehicle 1, an anchor at the front right of the oversized vehicle, and an anchor at the rear of the oversized vehicle. By way of example, a person wearing a tag 4 may be located closest to the front left anchor, which is visually indicated to the operator of the vehicle 1 by lighting up a corresponding sector 12 within a first indication functionality 10 associated with assigned fields of observation of the anchors 5, here by means of a circular display. Furthermore, the distance to the tag 4 is indicated, here, for example, by means of a variable bar indicator.

Indication 10 associated with the fields of observation of the anchors and indication 11 associated with the distance to the tag 4 may also be combined, e.g. wherein the distance is indicated by a defined color or blink code when lighting up the corresponding sector 12 within the circular display.

Position indication may further be an acoustic signal, e.g. a voice signal or a beep code, a tactile signal, e.g. by vibration of the steering wheel, or any combination of a visual, acoustic, and tactile signal.

In particular, when a plurality of anchors 5 are used, position indication may be more sophisticated, e.g. wherein the relative object shape is shown as multiple LEDs on a simple display, or as a particular shape on an LCD screen.

Furthermore, position indication may also involve indication of a threat level, e.g. based on the type of the tag 4, e.g. differentiating between a person or a vehicle, the position of the tag 4 relative to the oversized machine 1, heading information for the oversized machine, and the distance between the oversized machine and the tag 4.

Figure 4:
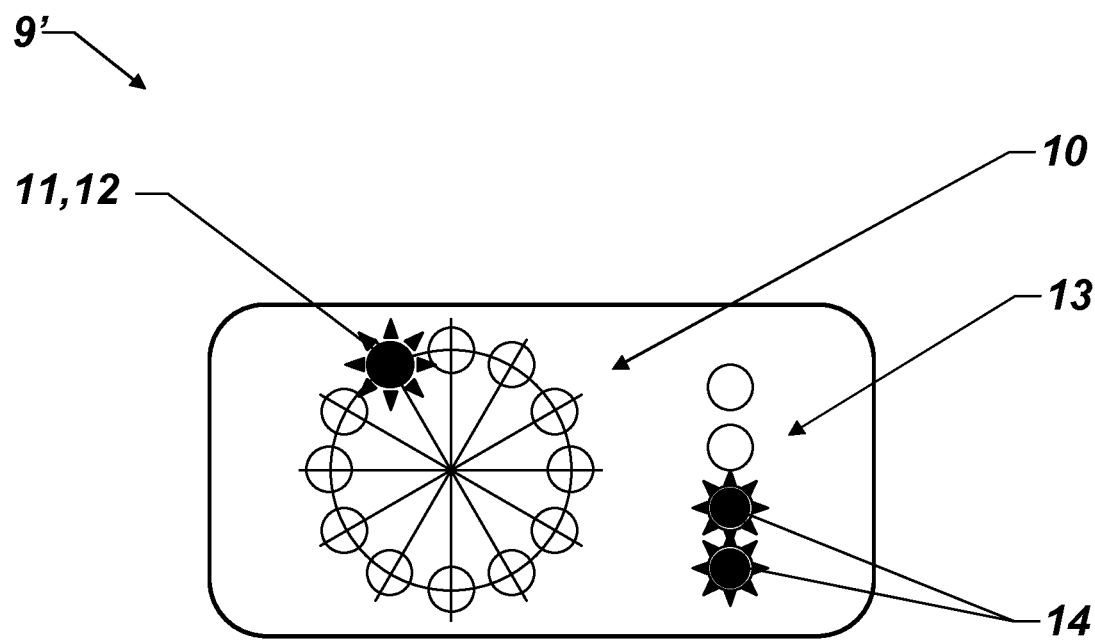
FIG. 4: another exemplary position indicator with an additional threat level indication.

FIG. 4 shows an example of a position indicator 9' comprising a threat level indication 13 in addition to an indication 10 associated with the fields of observation of the anchors.

By way of example, position information is given by a visual representation 10 of multiple sectors associated to different anchors, here arranged in a circular display, wherein distance indication 11 may be combined with the indication 10 associated with the fields of observation of the anchors, e.g. by a defined blink code or blink frequency of an LED lighting up in the sector 12 corresponding to an anchor indicative of a relative position of a person nearby wearing a tag.

In the example shown by the figure, the threat level indication 13 comprises an arrangement of different LEDs, e.g. wherein different LEDs may be associated with different threat levels, e.g. "no threat", "caution", "danger", and "stop".

For example, a person wearing a tag 4 may be located in a sector 12 at the front left of an oversized vehicle 1, indicated to the operator by an LED lighting up on the circular display 10, wherein the distance to the person is indicated by a defined blink frequency of the LED 12. Depending on the distance to the person and the heading direction of the vehicle, the threat level LEDs 13 may further indicate a status "caution" by lighting up associated LEDs 14.

Threat level indication and/or distance indication may further be an acoustic signal, a tactile signal, or any combination of a visual, acoustic, and tactile signal.

Thus, indication 10 associated with the fields of observation of the anchors, indication 11 associated with the distance to the tag 4, and threat level indication 13 may also be combined, e.g. wherein a threat level and/or distance is indicated by a defined color and/or blink code when lighting up the corresponding sector 12 within the circular display and/or the threat level and/or distance may be indicated by a defined buzzer frequency.

Furthermore, a determined threat level may cause an automatic intervention to the oversized object 1, e.g. an immediate stop of the object.

The threat level may further trigger a different position determination mode, e.g. wherein in a basic mode, position information is determined by a single anchor and thus only providing a rough position information and position display, whereas in a raised threat mode, position information is determined by multiple anchors, e.g. using triangulation, and thus providing improved position information on the tag, which may also be represented by a finer position display on the position indicator.

By way of example, the position information and/or the threat level may be transmitted as payload within the RF framework, and thus may be available both to anchors and tags. Thus, not only the operator of the oversized machine or vehicle may be warned but also the pedestrian or the small object at risk.

It goes without saying that the inventive proximity warning system may also be used in combination with a range of generic alarming and collision avoidance systems (CAS systems), e.g. it may be integrated into GNSS-based and/or radar based CAS systems.

Figure 5:
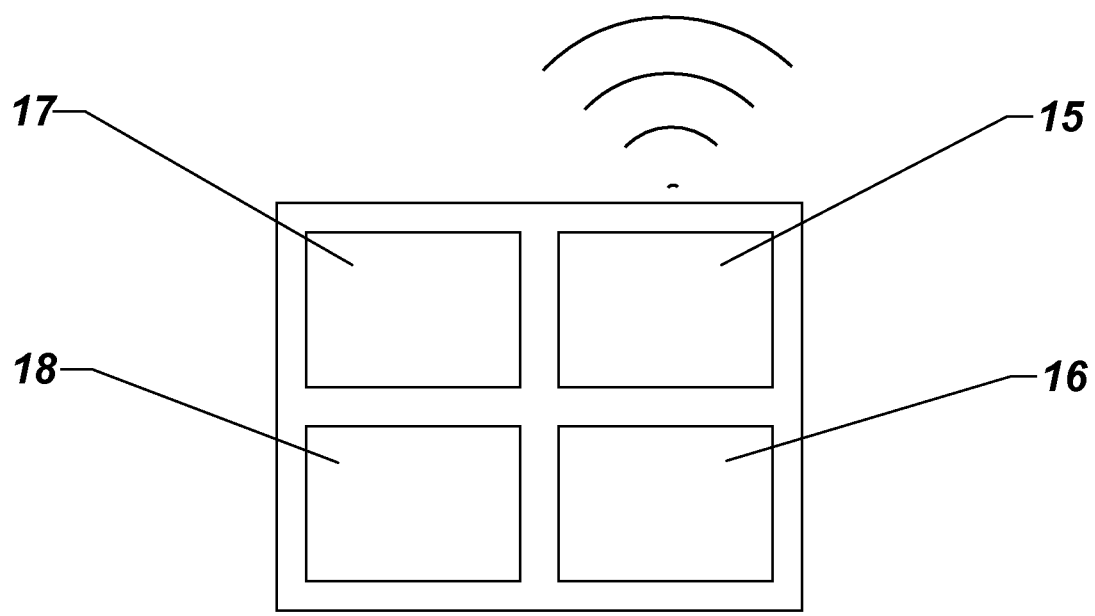
FIG. 5: schematic indication of tag components.

FIG. 5 schematically indicates exemplary tag components. By way of example, a tag may comprise a transceiver 15, particularly an ultra-wideband transceiver, for time-of-flight measurements, a control unit 16, e.g. a microprocessor, a power or battery management unit 17, e.g. using a Qi charging interface for wireless charging or pins integrated in case for wired charging, and a user interface 18, e.g. comprising a vibrator and/or buzzer for alerting a user and a button to acknowledge alarms or to trigger a panic signal.

Furthermore, the tag may comprise additional sensors, e.g. an acceleration sensor to determine idle mode for power saving, for man-down detection, or for secondary applications such as showing battery status when shaken, etc.

The tag components may be fully integrated in a compact base housing (not shown), e.g. including battery and charging electronics, as well as a vibration component, buzzer, and LEDs for alerting.

The base housing may be configured such that it can be quickly attached to different mounts for wearing on a helmet, e.g. with rubber strap around helmet or with elastic straps attaching at four points to tie down the tag on the helmet, a vest, e.g. wherein the mount is permanently attached to the vest, on wrist, e.g. using an armband, on the upper arm, e.g. similar to a mobile phone holder for running/jogging, or on a belt, e.g. using a belt-clip.

Figure 6:
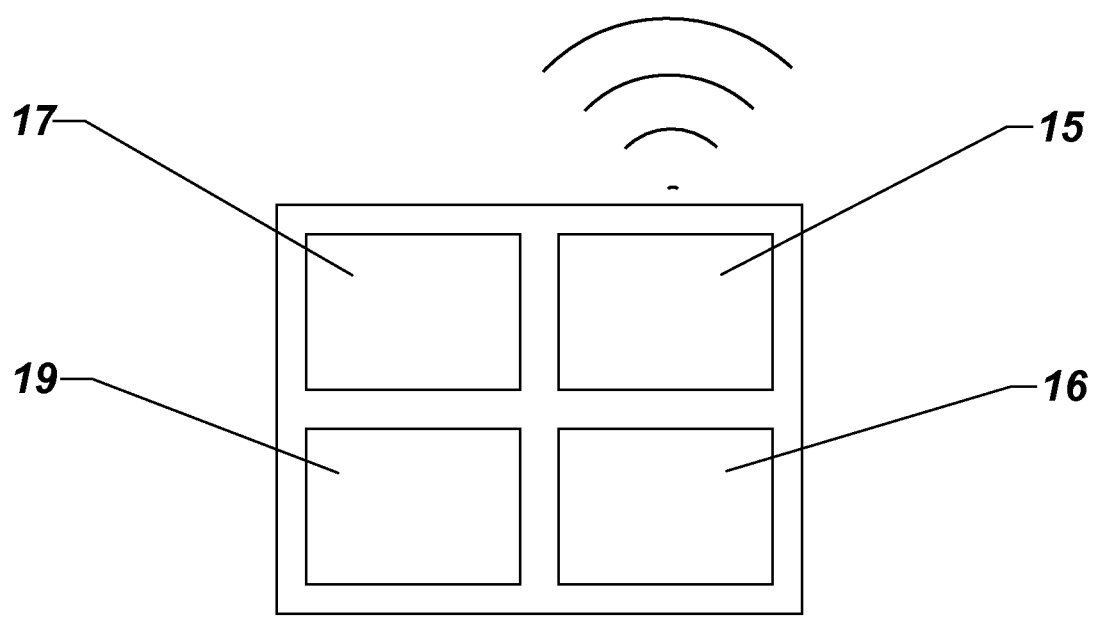
FIG. 6: schematic indication of anchor components.

FIG. 6 schematically indicates exemplary anchor components. By way of example, an anchor may comprise a transceiver 15, particularly an ultra-wideband transceiver, for time-of-flight measurements, a control unit 16, e.g. a microprocessor, a power or battery management unit 17, e.g. a robust power management taking power from a vehicle battery including surge protection, and a CAN transceiver 19, e.g. a CAN bus to connect to a radar CAN bus on the vehicle.

Furthermore other serial communication mediums, e.g. Ethernet may be used with relevant physical components to establish communication from anchor to the system.

Furthermore, the anchor may comprise additional sensors and generic components, e.g. an acceleration sensor to determine idle mode for power saving and an LED that shows device status, wherein the anchor components may be fully integrated in a compact base housing (not shown) configured such that it can be quickly attached to a range of different mounts.

In particular, the tags and anchors may be configured, e.g. by generic hardware and control components, such that, for example, drivers or passengers of an oversized vehicle wearing tags are not generating alarms as long as they are located within the cabin, e.g. alarming may be suppressed both on the vehicle display and on tags. For example, a special anchor may be placed inside the cabin or an anchor on top of the cabin may be configured as a cabin anchor. When tags detect that they are within a certain distance of the cabin anchor, they go into cabin mode, e.g. which may further trigger a reduced measurement rate, wherein the associated current cabin anchor ID may be part of the payload to reduce RF traffic such that no other cabin anchor needs to reply. Once a passenger is out of the cabin threshold, or, e.g. its tag does not get a reply from the associated cabin anchor twice in a row, the tag goes back to normal mode and all anchors range with it again. Such a distance threshold may for example be configurable for each cabin anchor, stored in a main unit and propagated through the CAN transceiver of the anchor.

Furthermore, tags may be configured such that tag alerting can be silenced. For example, while personnel should get warnings if an oversized vehicle approaches it may not be necessary that repeated alarms are provided related to the same vehicle, e.g. when mechanics are moving/working around the vehicle. However, e.g. depending on a changed threat level, the tag configuration should alert personnel even if alerts have been silenced.

For example, anchors may include a vehicle identification in the status messages sent to the tag. The tag groups ranging from different anchors on the same vehicle together, and only acts upon the closest anchor. When personnel acknowledge the alarm on a tag by pressing an interface button, all current vehicles, at their current ranges, may be silenced. If a vehicle (i.e. an anchor configuration but not a single anchor) moves to a closer range, the tag should generate an alarm again for the vehicle at its new range, while vehicles moving further away will not cause the alarm to be renewed. If a vehicle moves out of range, it may be forgotten by the tag, so that if it reappears, it will cause a new alert.

By way of another example, an oversized vehicle may have configurable areas and/or speed thresholds, which trigger transmission of a suppression flag as part of the CAN heartbeat message to the anchors. Thus, tags may still be shown on a vehicle display but tag alerts may be avoided if the vehicle moves above certain speeds. Alternatively the warning distances may be temporarily set to infinity, e.g. wherein the anchors continue to perform ranging as usual, but add a flag into the RF report payload. When a tag receives such a report, it is not included in the threat computation. The state may continuously be updated by the anchor, based on the flag in the CAN message. The anchors keep reporting their results through CAN messages to the main unit, where the behavior can be configured, e.g. "no audible but only visual alerts".

Furthermore, for example, a main unit associated with the site may issue a general alarm to the tags, wherein the main unit sends two bits in the CAN heartbeat message to the anchors to set four possible states (0: "no Alarm", 1: "Alert Low", 2: "Alert Medium", 3: "Alert High"). Such a general alarm may override other lower or equal alerts, e.g. wherein it may be possible that a worker wearing a tag suppresses a medium/low alert but not a high alert.

Of course numerous further modifications and tag/anchor configurations are possible, and the inventive proximity warning system may be used in combination with a range of generic alarming systems. For example, since generic tracking radars used on surface mines are limited in range due to multiple reflections on site, the inventive RF proximity warning system may for example be used to extend and backup conventional tracking radars and to warn pedestrians and drivers beyond the radar range.

Figure 7:
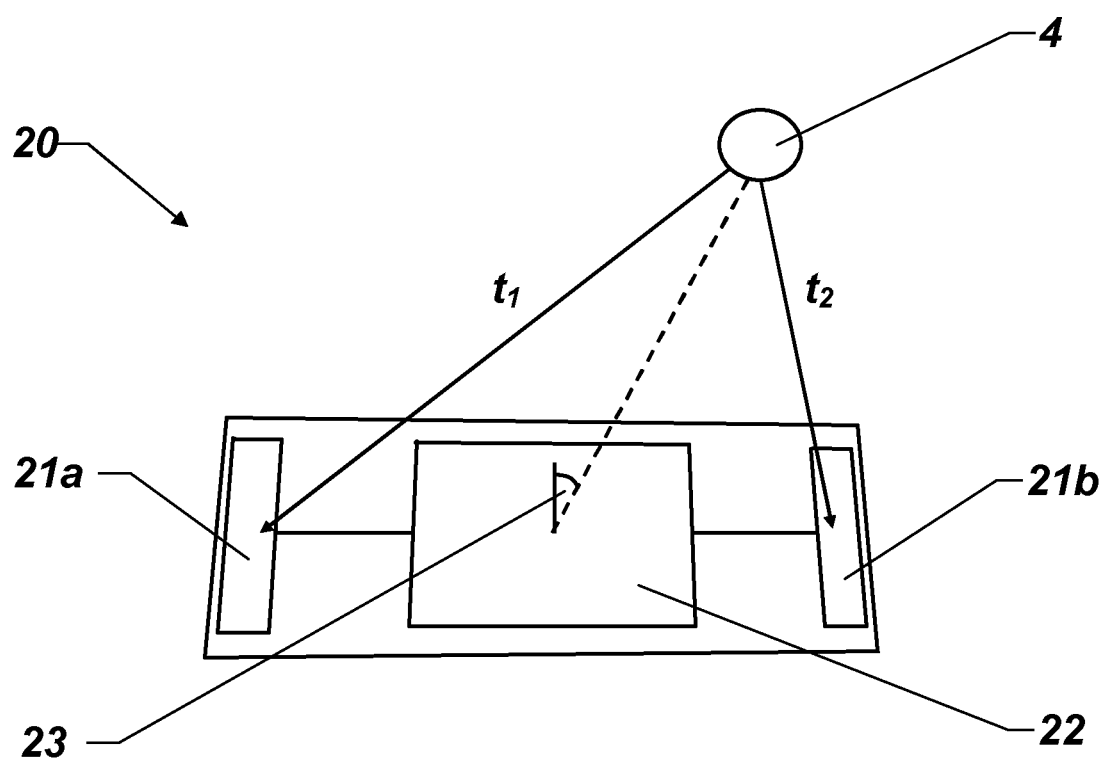
FIG. 7: schematic illustration of an angle-of-arrival anchor.

FIG. 7 shows a schematic illustration of an inventive angle-of-arrival (AoA) anchor 20, which may be used for improved position determination by the position determination unit. The anchor 20 comprises a first 21a and a second 21b transceiver, which are co-located and time synchronized.

For example, the basic structure of the AoA anchor 20 may be similar to a standard anchor as described by FIG. 6, wherein the AoA anchor 20 uses a common block 22, e.g. comprising the control unit 16 (FIG. 6), a power or battery management unit 17, and a CAN transceiver 19. A synchronization signal is regularly sent to keep the counters of the two co-located transceivers 21a,21b aligned. Ranging is performed basically the same way as with a standard anchor, e.g. based on the measurement protocol as described above, whereas when receiving the FINAL message from the tag 4, a FINAL receive timestamp $t_1,t_2$ is measured on both transceivers 21a,21b. The time difference $\Delta t$ is then transferred to a distance difference $\Delta d \approx c \cdot \Delta t$ (c: speed of light), which is used for computing the angle-of-arrival 23 (AoA), i.e. $AoA \approx \sin^{-1} \Delta d$.

Thus, based on this methodology, each measurement by the AoA anchor 20 yields a distance and angle from the AoA anchor 20 to the tag 4. However, due to the short baseline between the transceivers 21a,21b, the measurement noise in the angle may quite large. For example, the accuracy of the AoA anchor 20 may be improved using an extended (or unscented) Kalman filter, wherein tags 4 are tracked, i.e. tracking position and speed, such that the position is estimated with sufficient accuracy.

Furthermore, when a tag 4 is in the visibility of multiple anchors, triangulation can occur with both distance and angle measurements of each anchor. This information may then also be used for ambiguity resolution (e.g. assessing whether the tag 4 is in front or behind the baseline of the two transceivers 21a,21b).

Although the invention is illustrated above, partly with reference to some preferred embodiments, it must be understood that numerous modifications and combinations of different features of the embodiments can be made. All of these modifications lie within the scope of the appended claims.

What is claimed is:

1. A system for generating proximity warnings on a site on which a regular size object is at risk from a movement of an oversized movable object, the system comprising:
   a point-to-point radio ranging system comprising
   a set of anchors adapted and specifically foreseen to be mounted on the oversized object,
   a tag adapted and specifically foreseen to be mounted on the regular size object, and
   a distance determining unit configured for providing a set of distance determinations between each one of the set of anchors and the tag, based on a defined measuring protocol of a time-of-flight measurement by radio frequency signals, particularly ultra-wideband signals,
   a warning unit configured for providing a proximity warning based on the set of distance determinations,
   an anchor status dataset stored in a system storage, comprising information on local positions within an arrangement of the set of anchors, wherein a local position is assigned to each one of the set of anchors,
   a position determining unit configured for determining position information of the tag relative to the arrangement of the set of anchors, based on an automated procedure comprising the steps of
      identifying one of the set of anchors as a position determination anchor, wherein the position determination anchor is defined as the anchor with the closest measured distance to the tag determined by the distance determining unit, and
      assigning a field of observation to the position determination anchor, based on the anchor status dataset,
   wherein the warning unit comprises a position indicator configured for indicating the position of the tag relative to the arrangement of anchors, based on at least
   a first indication associated with the field of observation assigned to the position determination anchor, and
   a second indication associated with the distance between the position determination anchor and the tag.

2. The system according to claim 1, wherein the automated procedure for determining position information of the tag further comprises the steps of
   identifying another anchor as an auxiliary anchor to the position determination anchor, and
   deriving the position of the tag relative to the arrangement of anchors, based on the anchor status dataset, the field of observation assigned to the position determination anchor, and a triangulation including the position determination anchor, the auxiliary anchor, and the tag.

3. The system according to claim 1, wherein:
   each one of the set of anchors comprises a first and a second transceiver, which are co-located and configured to be time synchronized, and
   the measuring protocol comprises determining a time difference between receive timestamps of radio frequency signals receiving the first transceiver and the second transceiver of the positioning determination anchor,
   in such a way that
   an angle-of-arrival of radio-frequency signals is calculated for the position determination anchor, based on the time difference,
   wherein assigning the field of observation to the position determination anchor is based on the calculated angle-of-arrival of the position determination anchor.

4. The system according to claim 1, wherein:
   each one of the set of anchors comprises its local position information with respect to the arrangement of anchors, and
   the measuring protocol comprises transmission of anchor positions as payload within the point-to-point radio ranging system, such that:
the position information of the tag is determined by the tag, particularly based on triangulation including the position determination anchor, the tag, and at least another one of the set of anchors, wherein
the position information of the tag is transmitted to the set of anchors as payload within the point-to-point radio ranging system.

5. The system according to claim 4, wherein:
the system comprises a global positioning system configured for providing global position information of the arrangement of anchors,
each one of the set of anchors is configured to be provided with global positioning information from the global positioning system, and
the measuring protocol comprises transmission of absolute anchor positions as payload within the point-to-point radio ranging system, based on local position information of anchors and the global positioning information,
such that:
the position information determined by the tag is determined as an absolute position.

6. The system according to claim 1, wherein:
the system comprises a global positioning system configured for providing global position information of the arrangement of anchors,
each one of the set of anchors comprises its local position information with respect to the arrangement of anchors,
each one of the set of anchors is configured to be provided with global positioning information from the global positioning system, and
the system comprises a central position determination unit,
wherein the system is configured that absolute anchor positions, based on local position information of anchors and the global positioning information, and the set of distance determinations are provided to the central position determination unit, in such a way that the position information of the tag is determined by the central position determination unit as an absolute position based on triangulation including the position determination anchor, the tag, and at least another one of the set of anchors.

7. The system according to claim 1, wherein the arrangement of anchors comprises at least three anchors, which are arranged in such a way that the vertical projection points of the at least three anchors are arranged along the sides of a rectangular basic shape and that a combination of assigned fields of observation of the at least three anchors provides a horizontal all-round visibility around the basic rectangular shape, wherein
a first anchor projection is arranged at a first corner of the basic rectangular shape,
a second anchor projection is arranged at a second corner, adjacent to the first corner, of the basic rectangular shape, and
a third anchor projection is arranged at the side of the basic rectangular shape opposite to the side spanned by the first and second anchor.

8. The system according to claim 7, wherein a fourth anchor is arranged in such a way that its vertical projection point lies within the basic rectangular shape.

9. The system according to claim 1, wherein the position indicator is configured to provide the position indication of the tag by at least one of
a visual coding,
an acoustic coding, and
a tactile coding.

10. The system according to claim 1, the position indication further comprises indication of a threat level.

11. The system according to claim 10, wherein the threat level is determined based on at least one of:
a tag identification,
an anchor identification,
the position information of the tag,
heading information for the arrangement of anchors, and
the speed of the arrangement of anchors.

12. The system according to claim 10, wherein different position determination modes or different position indication modes are triggered based on a defined set of threat levels.

13. The system according to claim 1, wherein the system is configured that the position information or the threat level is transmitted as payload within the point-to-point radio ranging system.

* * * * *